United States Patent
Utsuno et al.

(10) Patent No.: US 9,441,664 B2
(45) Date of Patent: Sep. 13, 2016

(54) SEAL WASHER

(71) Applicant: Aoyama Seisakusho Co., Ltd., Niwa-gun (JP)

(72) Inventors: Ryuji Utsuno, Niwa-gun (JP); Masahiro Matsuki, Niwa-gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 548 days.

(21) Appl. No.: 13/877,397

(22) PCT Filed: Nov. 26, 2012

(86) PCT No.: PCT/JP2012/080433
§ 371 (c)(1),
(2) Date: Apr. 2, 2013

(87) PCT Pub. No.: WO2014/080511
PCT Pub. Date: May 30, 2014

(65) Prior Publication Data
US 2015/0247524 A1    Sep. 3, 2015

(51) Int. Cl.
*F16B 43/00* (2006.01)

(52) U.S. Cl.
CPC .................... *F16B 43/001* (2013.01)

(58) Field of Classification Search
CPC ..................................................... F16B 43/001
USPC ........................................ 411/542, 369, 371.1
See application file for complete search history.

(56) References Cited

U.S. PATENT DOCUMENTS

| 2,795,444 | A | * | 6/1957 | Nenzell | F16B 43/00 |
| | | | | | 277/637 |
| 3,500,712 | A | | 3/1970 | Wagner | |
| 3,519,279 | A | * | 7/1970 | Wagner | 411/542 |
| 4,026,183 | A | | 5/1977 | Bart | |
| 4,280,390 | A | * | 7/1981 | Murray | 411/542 |
| 4,712,802 | A | * | 12/1987 | Hewison et al. | 411/542 |
| 5,201,625 | A | | 4/1993 | Takenouchi et al. | |

(Continued)

FOREIGN PATENT DOCUMENTS

| EP | 0 795 691 A1 | 9/1997 |
| JP | 47-46532 | 11/1972 |

(Continued)

OTHER PUBLICATIONS

International Search Report dated Dec. 5, 2012 (with English translation).

(Continued)

*Primary Examiner* — Flemming Saether
(74) *Attorney, Agent, or Firm* — Burr & Brown, PLLC (57) ABSTRACT

A seal washer of the present invention includes a metal washer body including a center hole, an outer resilient material projecting from an outer periphery of the washer body to a location lower than a lower surface of the washer body, and an inner resilient material provided on an inner periphery of the washer body which faces the center hole. If a fastening force in an axial direction is applied, since the lower surface of the washer body metal-touches on a mating member, loosening does not occur unlike a conventional technique. In addition, since no further compression load is applied to the resilient material, a phenomenon that the resilient material is deformed in a crushed manner does not occur.

4 Claims, 7 Drawing Sheets

(56) References Cited

U.S. PATENT DOCUMENTS

| | | | | |
|---|---|---|---|---|
| 5,836,427 | A * | 11/1998 | Nakajima | F16B 43/001 188/73.37 |
| 5,906,463 | A * | 5/1999 | Damm | F16B 43/001 411/369 |
| 7,018,153 | B2 * | 3/2006 | Behle | F16B 37/041 411/182 |
| 7,854,434 | B2 * | 12/2010 | Heiman et al. | 277/644 |
| 8,186,691 | B2 * | 5/2012 | Baxi | F16J 15/127 277/609 |
| 8,883,059 | B2 * | 11/2014 | Lewis | F16B 5/065 264/250 |
| 2008/0252020 | A1 | 10/2008 | Heiman et al. | |

FOREIGN PATENT DOCUMENTS

| | | |
|---|---|---|
| JP | 52-66862 | 5/1977 |
| JP | 52-140763 | 11/1977 |
| JP | 2000-249132 | 9/2000 |
| JP | 2008-255975 | 10/2008 |
| JP | 2011-002068 A1 | 1/2011 |

OTHER PUBLICATIONS

Extended European Search Report (Application No. 12834584.0) dated May 11, 2016.

* cited by examiner

SEAL WASHER

BACKGROUND OF THE INVENTION

The present invention relates to a seal washer which is used in combination with a bolt and which has a water shut-off function.

FIELD OF THE INVENTION

To mount a part such as a rear spoiler on a body of an automobile for example, a through hole is formed in the body, a bolt is inserted into the through hole and a nut is fixed from inside of the body. A washer on which a water shut-off sponge is pasted is interposed between the body and a bolt seating surface, thereby preventing water from entering from a gap between the bolt and the through hole. The examples are described in patent documents 1 and 2.

According to the washer having the sponge, however, since there is no metal touch portion between the washer and the body, there is a concern that the washer is loosened. If the bolt is strongly fastened so that the washer is not loosened, the water shut-off sponge is deformed by a fastening load, and there is another concern that the water shut-off function is deteriorated.

DESCRIPTION OF RELATED ART

Patent Documents

Patent Document 1:Japanese Published Patent Application No. 2000-249132
Patent Document 2: Japanese Examined Patent Application Publication No. 47(1972)-46532

SUMMARY OF THE INVENTION

Therefore, it is an object of the invention to solve the conventional problem, and to provide a seal washer which is not loosened and which has a stable water shut-off function.

A first aspect of the present invention has been accomplished to solve the above-described problem. A seal washer of the first aspect of the present invention includes a metal washer body including a center hole, an outer resilient material projecting from an outer periphery of the washer body to a location lower than a lower surface of the washer body, and an inner resilient material provided on an inner periphery of the washer body which faces the center hole.

As defined in a second aspect of the present invention, it is preferable that a detent portion is formed between the washer body and the resilient materials.

As defined in a third aspect of the present invention, it is preferable that the outer resilient material and the inner resilient material are continuous with each other. As defined in a fourth aspect of the present invention, it is preferable that the outer resilient material and the inner resilient material are insert-molded together with the washer body.

The seal washer of the present invention is used in combination with the bolt, and when a fastening force in an axial direction is applied to the washer body by the bolt inserted into the center hole, first of all, the resilient material is compressed and comes into intimate contact with a surface of a mating member. From this state, when the fastening force in the axial direction is further applied to the washer body, the lower surface of the washer body metal-touches on the mating member. According to the seal washer of the invention, since the washer body metal-touches on the mating member in a fastening operation-completed state, if an axial force is applied to the bolt and the bolt is fastened, loosening does not occur unlike the conventional technique. Further, since no further compression load is applied to the resilient material, a phenomenon that the resilient material is deformed in a crushed manner does not occur and the water shut-off function is not deteriorated.

Further, as an inner periphery of the washer body facing the center hole is provided with an inner resilient material, water does not enter from the gap between the bolt and the seal washer.

If a detent portion is formed as in the second aspect of the present invention, the resilient material does not rotate with respect to the washer body. If a structure in which the outer resilient material and the inner resilient material are continuous with each other as in the third aspect of the present invention, the resilient materials do not become detached from the washer body. Further, if the outer resilient material and the inner resilient material are insert-molded together with the washer body, there is an advantage of producing the seal washer at low cost.

DETAILED DESCRIPTION OF THE INVENTION

Embodiments of the present invention will be described below.

In FIGS. 1 to 4, a reference number 10 represents a washer body of a seal washer of the invention. The washer body 10 is made of metal and has a disk shape, and includes a center hole 11. A fastening member such as a bolt is inserted into the center hole 11.

Figure 1:
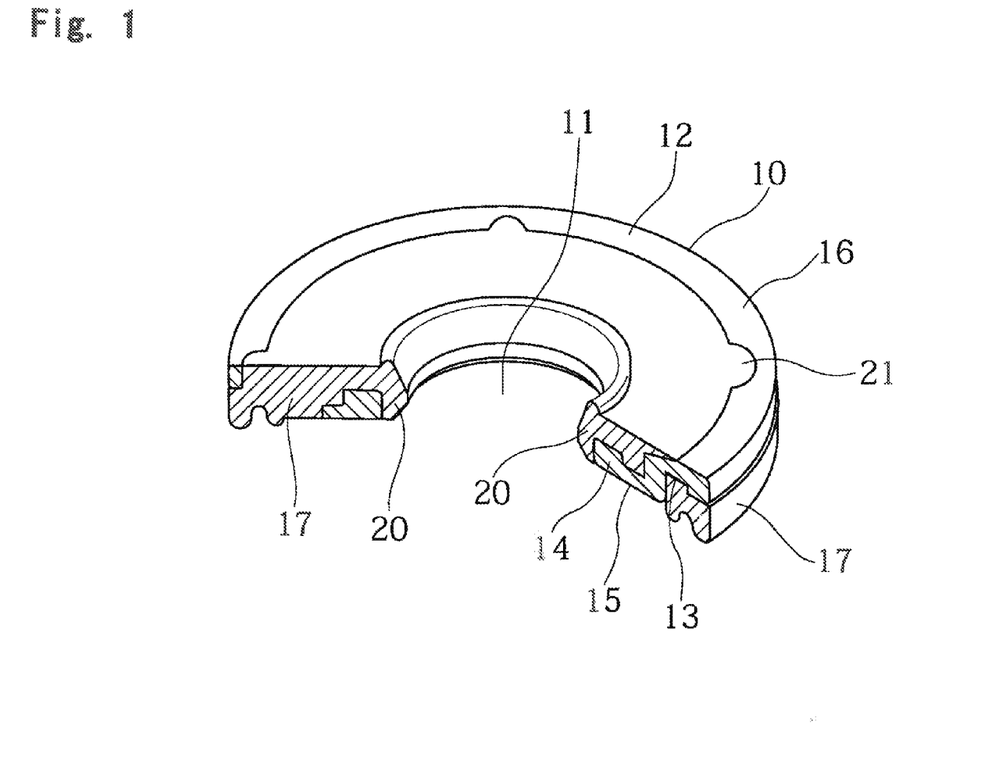
FIG. 1 is a perspective sectional view showing a first embodiment of the present invention, wherein a left side of FIG. is a sectional view taken along a line A-O in FIG. 3 and a right side of FIG. 1 is a sectional view taken along a line B-O in FIG. 3.
Figure 4:
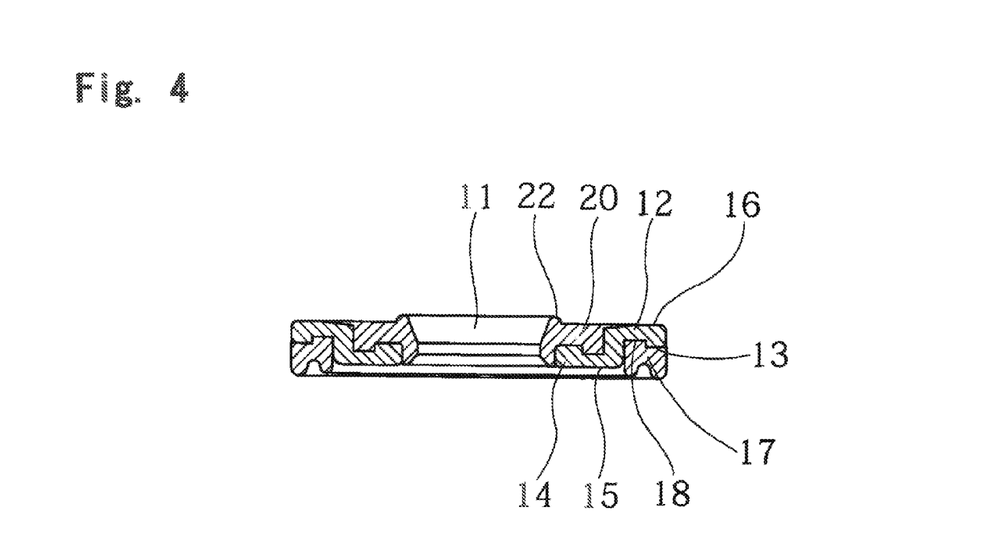
FIG. 4 is a sectional view showing the first embodiment.

As shown in FIGS. 1 and 4, the washer body 10 of this embodiment has a step shape in which a lower surface 13 of an outer periphery 12 of the washer body 10 becomes higher than a lower surface 15 of an inner periphery 14 of the washer body 10. The lower surface 15 of the inner periphery 14 and an upper surface 16 of the outer periphery 12 are flat surfaces.

Figure 3:
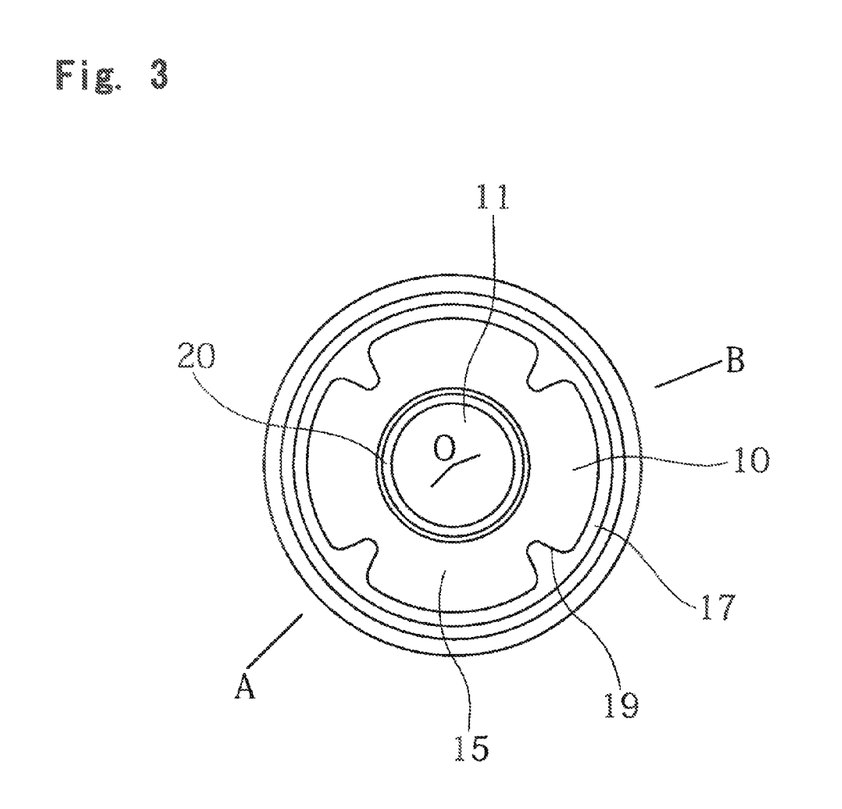
FIG. 3 is a bottom view showing the first embodiment.

An outer resilient material 17 is insert-molded together with the lower surface 13 of the outer periphery 12. In a state before a fastened state, the outer resilient material 17 projects downward of the lower surface 15 of the inner periphery 14. In this embodiment, to enhance adhesion between the washer body 10 and the outer resilient material 17, a concave groove 18 is formed in the lower surface 13 of the outer periphery 12. As shown in FIG. 3, a plurality of concave portions 19 is formed in the lower surface 15 of the inner periphery 14 of the washer body 10, and the concave portions 19 serve as detent portions with respect to the outer resilient material 17. In this embodiment, a lower surface of the outer resilient material 17 has an inner and outer double ring shape.

Figure 2:
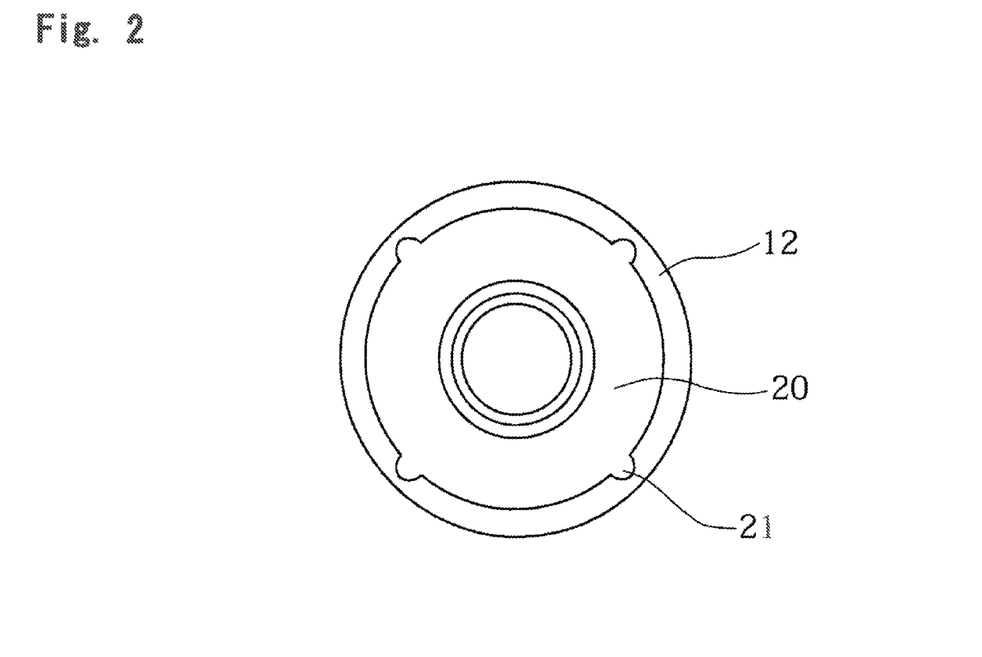
FIG. 2 is a plan view showing the first embodiment.

An inner resilient material 20 for shutting off water from a periphery of the center hole 11 is also insert-molded together with the inner periphery 14 of the washer body 10. This inner resilient material 20 has a shape to cover an inner side of the washer body 10 from an upper surface of the inner periphery 14 of the washer body 10. A ring-shaped projection 22 projecting upward of the upper surface 16 of the outer periphery 12 is formed on an upper surface of the inner resilient material 20. As shown in FIG. 2, a plurality of concave portions 21 is formed also in the inner periphery 14 of the washer body 10, and the concave portions 21 serve as detent portions with respect to the inner resilient material 20.

The outer resilient material 17 and the inner resilient material 20 are made of the same material, and they are insert-molded in a state where they are continuous with each other as shown in a left side sectional view in FIG. 1. Such a structure is advantageous for preventing the resilient materials from becoming detached from the washer body, and for reducing production costs. An example of the material is olefin-based elastomer but other materials may also be employed of course. If the outer resilient material 17 and the inner resilient material 20 are integrally formed with the washer body 10 by insert molding in this manner, they can be used and handled easily.

Figure 5:
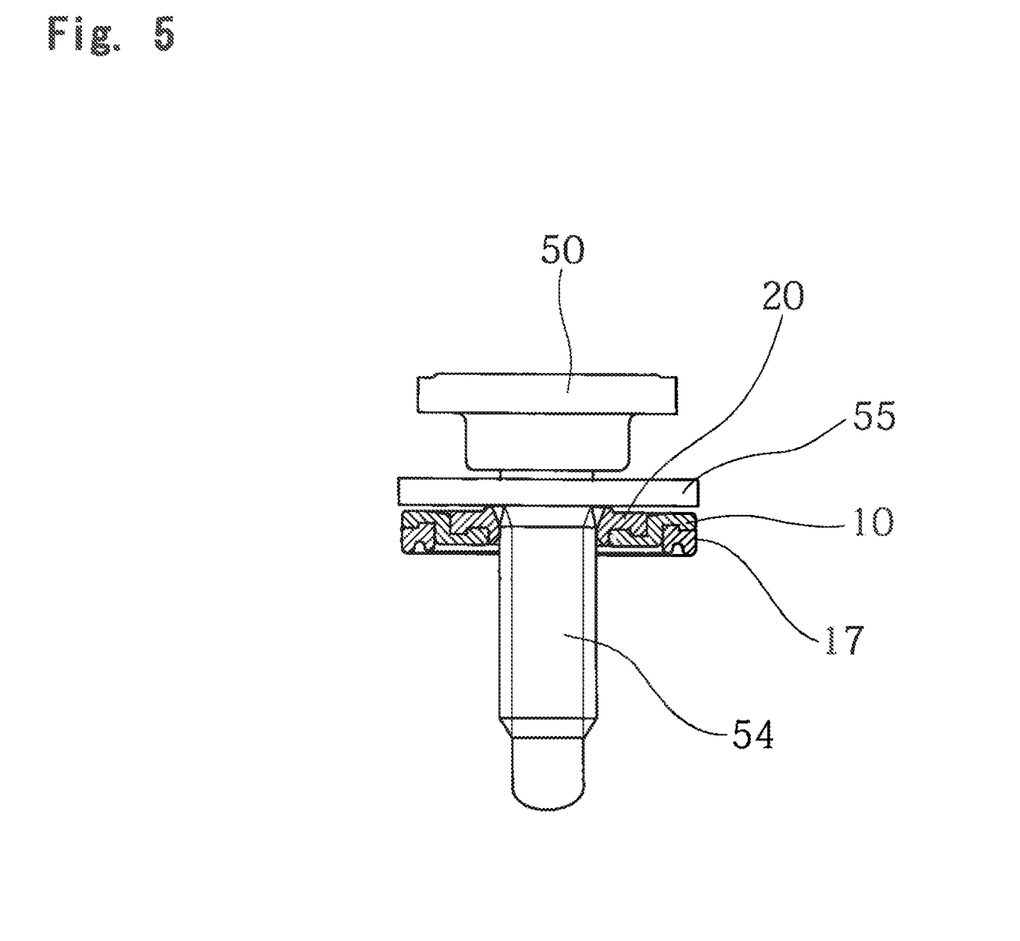
FIG. 5 is a sectional view showing a using state of the first embodiment.
Figure 6:
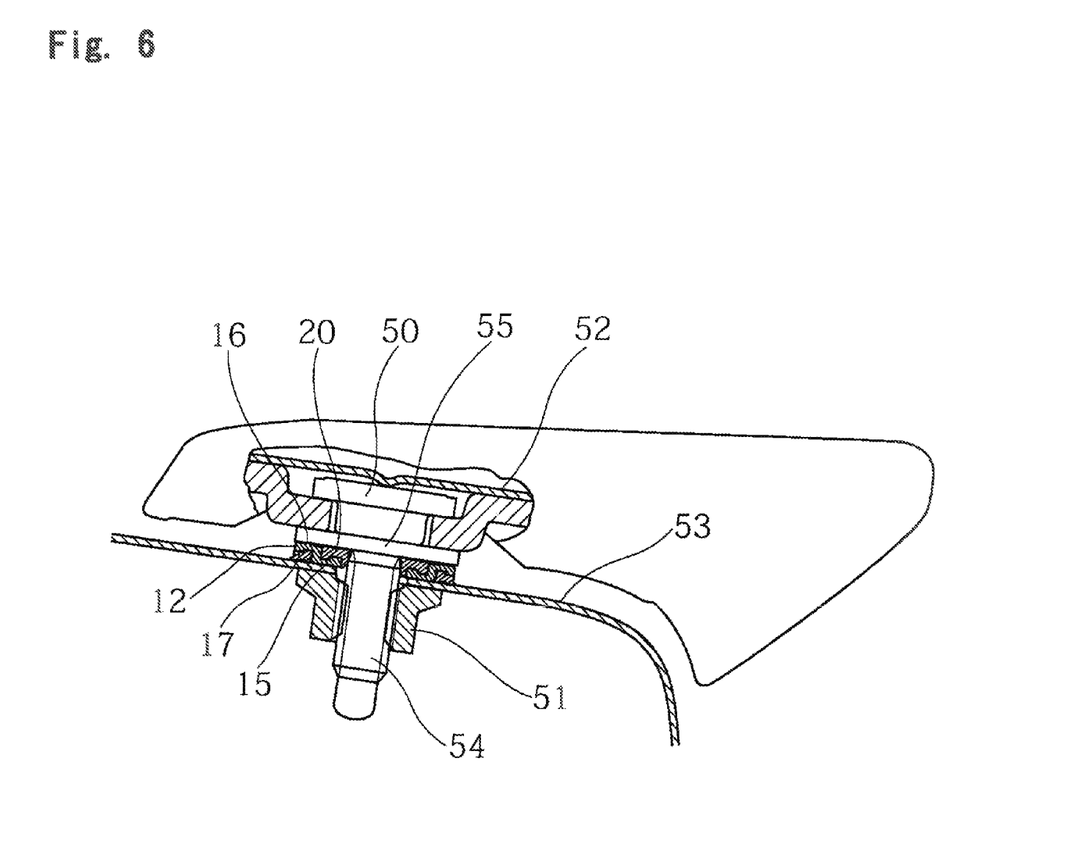
FIG. 6 is a sectional view showing a fastened state of the first embodiment.

The seal washer configured as described above is used in combination with a fastening tool such as a bolt as shown in FIG. 5. FIG. 6 shows a state where a member 52 is fastened to a body 53 by a step bolt 50 and a nut 51. When a shaft 54 of the step bolt 50 is inserted into the center hole 11 of the seal washer and fastened by means of the nut 51, the lower surface 15 of the inner periphery 14 of the washer body 10 metal-touches on the body 53, and the outer resilient material 17 seals an outer periphery of the lower surface 15 as shown in the drawing.

According to the seal washer of the invention, since the washer body 10 metal-touches on the mating member in a fastening-completed state as described above, loosening does not occur unlike the conventional technique. In addition, since no further compression load is applied to the outer resilient material 17, a phenomenon that the outer resilient material 17 is deformed in a crushed manner does not occur. Furthermore, since a periphery of the center hole 11 is sealed by the inner resilient material 20, a complete water shut-off effect can be secured. In this embodiment, concerning the upper surface of the seal washer also, the upper surface 16 of the outer periphery 12 metal-touches on a washer 55, and reliable sealing is established by the ring-shaped projection 22 of the inner resilient material 20.

Figure 9:
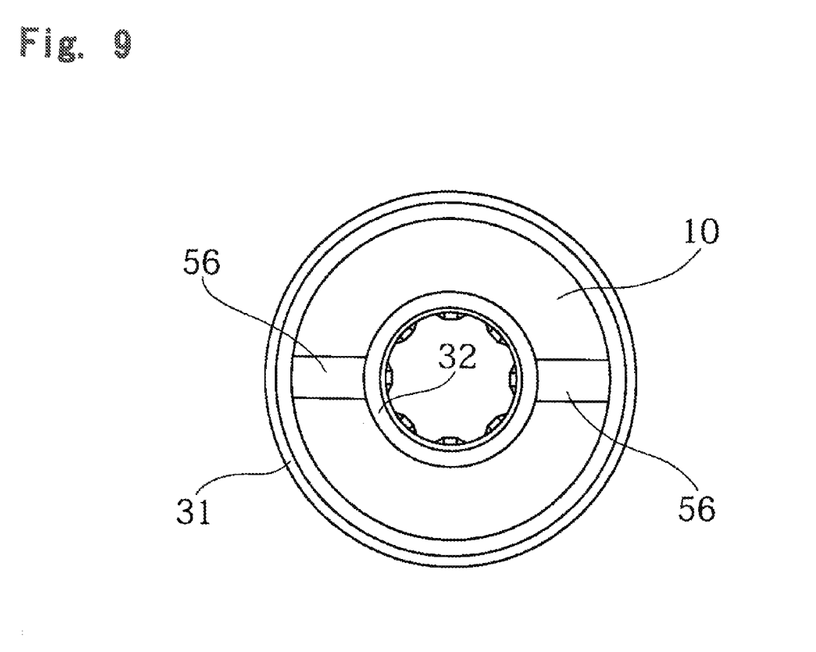
FIG. 9 is a plan view showing the second embodiment.
Figure 10:
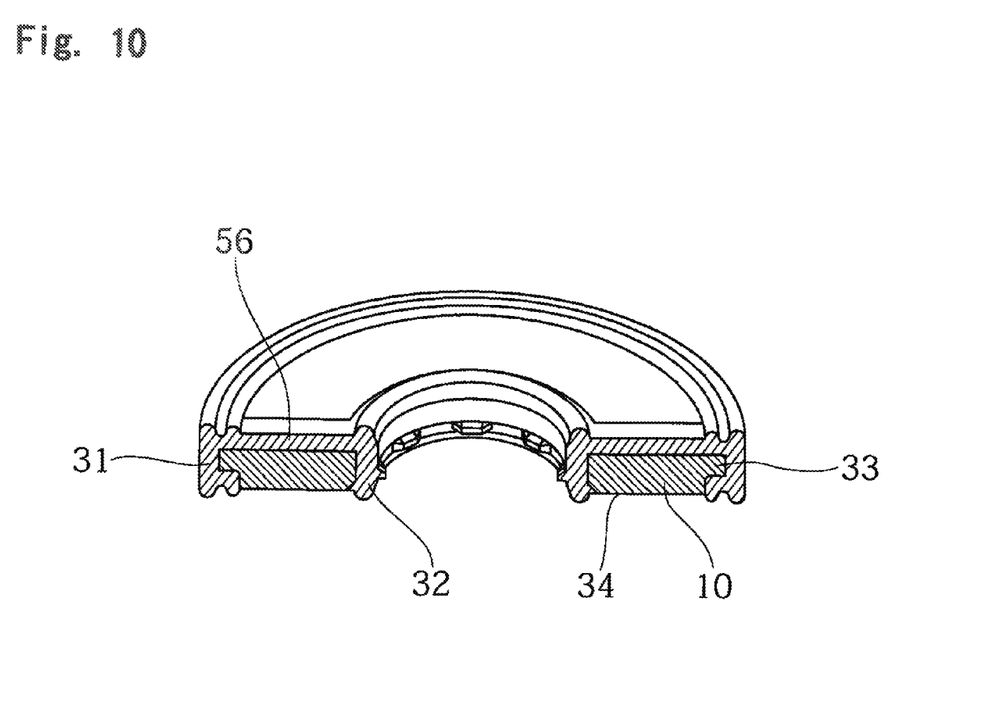
FIG. 10 is a sectional perspective view showing the second embodiment.

FIGS. 7 to 10 show a second embodiment of the invention. According to a seal washer of the second embodiment, a washer body 10 is formed into a disk shape having a center hole 11, and an outer resilient material 31 and an inner resilient material 32 are respectively provided on an outer periphery and an inner periphery of the washer body 10. These resilient materials 31 and 32 have a U-shaped cross section, and their upper and lower ends cover upper and lower surfaces of the washer body 10. As shown in FIGS. 9 and 10, the outer resilient material 31 and the inner resilient material 32 are connected to each other through radially extending connecting portions 56 at a plurality of locations. Therefore, the outer resilient material 31 and the inner resilient material 32 can integrally be formed together.

Figure 7:
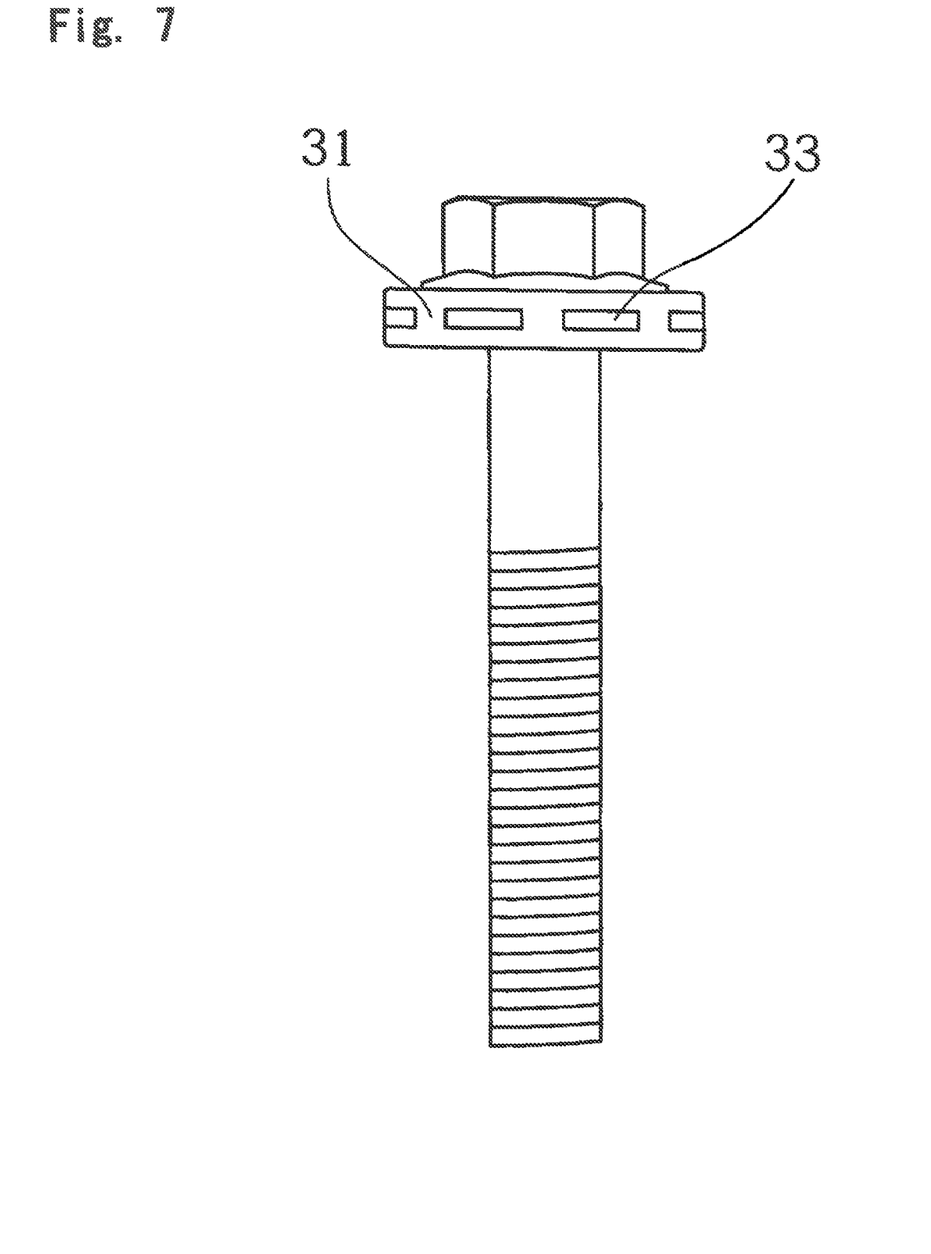
FIG. 7 is a front view showing a using state of a second embodiment.
Figure 8:
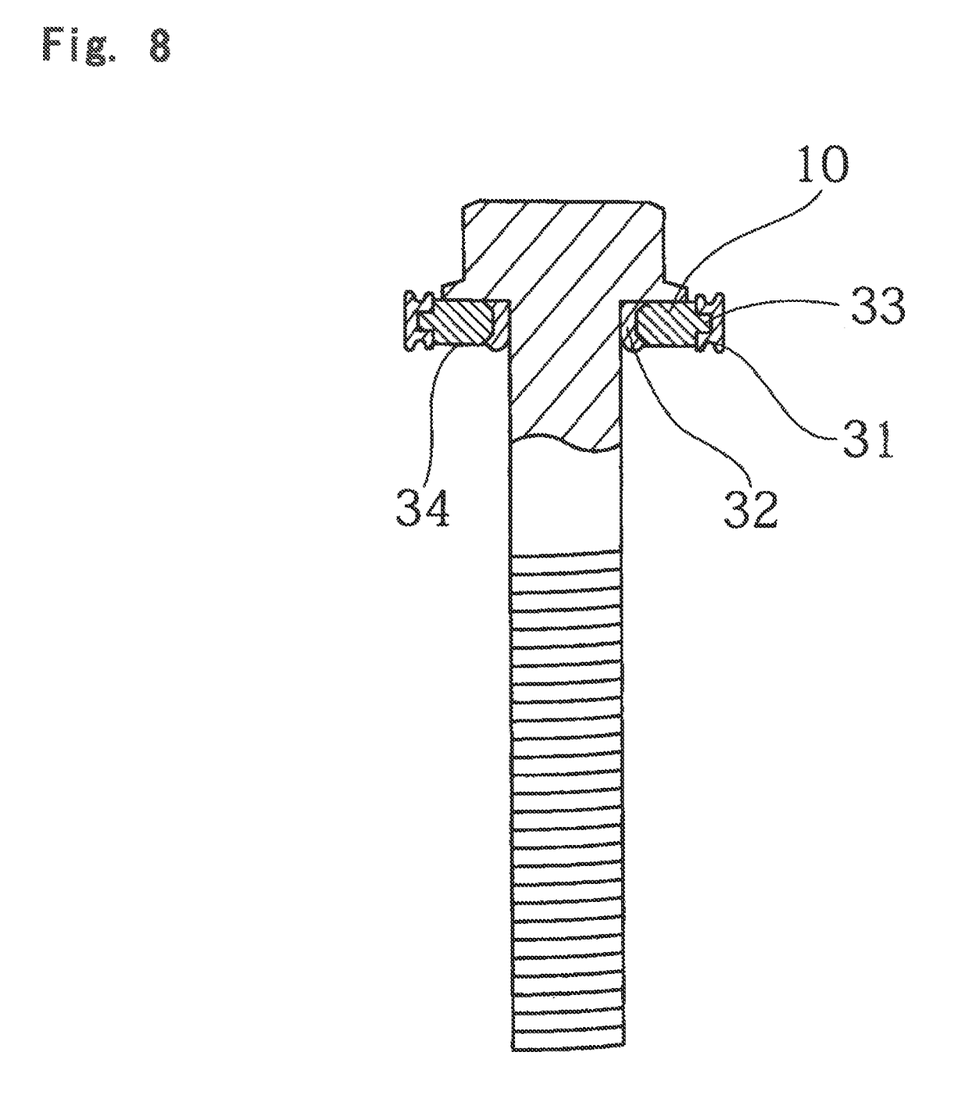
FIG. 8 is a partial sectional view showing the using state of the second embodiment.

Projections 33 are provided on an outer peripheral surface of the washer body 10 at constant intervals from one another. As shown in FIG. 7, these projections 33 are fitted into the outer resilient material 31, thereby performing a detent function.

Lower surfaces of the outer resilient material 31 and the inner resilient material 32 project downward to locations lower than the lower surface of the washer body 10, and when they are fastened, the outer resilient material 31 and the inner resilient material 32 first come into contact with the mating member. When a bolt is further fastened, these resilient materials 31 and 32 are compressed, and a lower surface 34 of the washer body 10 metal-touches on the mating member. Hence, loosening does not occur as in the first embodiment. In addition, no further compression load is applied to the resilient materials 31 and 32. Since a periphery of the center hole 11 is sealed by the inner resilient material 31, a complete water shut-off effect can be secured.

As described above, the seal washer of the invention is used in combination with a bolt, and since the washer body 10 metal-touches on the mating member, loosening does not occur, and a stable water shut-off function can be exerted. Further, since the inner resilient material 32 can also seal a portion of the center hole 11, a more complete water shut-off function can be exerted.

EXPLANATION OF SYMBOLS

10 washer body
11 center hole
12 outer periphery
13 lower surface of outer periphery
14 inner periphery
15 lower surface of inner periphery
16 upper surface of outer periphery
17 outer resilient material
18 concave groove
19 concave portion
20 inner resilient material
21 concave portion
22 ring-shaped projection
31 outer resilient material
32 inner resilient material
33 projection
34 lower surface of washer body
50 step bolt
51 nut
52 member
53 body
54 shaft
55 washer
56 connecting portion

The invention claimed is:

1. A seal washer comprising a disk shaped metal washer body that includes outwardly extending projections formed on an outer peripheral surface of the washer body and a periphery of a center hole that forms an inner peripheral surface of the washer body, an outer resilient material having a U-shaped cross section and an inner resilient material are respectively provided on the outer peripheral surface and the inner peripheral surface of the washer body such that upper and lower surfaces of the projections and an upper surface and a lower beveled surface of the washer body adjacent to the center hole are covered by upper and lower ends of each resilient material, and the outer resilient material and the inner resilient material projecting to a location lower than a lower surface of the washer body, and with the inner resilient material being provided on the inner peripheral surface of the washer body which faces the center hole.

2. The seal washer according to claim 1, wherein a detent portion is formed between the outwardly extending projections of the washer body and the resilient materials.

3. The seal washer according to claim 1, wherein the outer resilient material and the inner resilient material are continuous with each other via a radially connecting portion therebetween.

4. The seal washer according to claim 3, wherein the outer resilient material and the inner resilient material are insert-molded together with the washer body.

\* \* \* \* \*